United States Patent [19]
Rhee et al.

[11] Patent Number: 5,795,942
[45] Date of Patent: Aug. 18, 1998

[54] WATER SOLUBLE CONDUCTIVE POLYANILINE COMPOSITES AND PROCESS FOR PREPARING THE SAME

[75] Inventors: Suh Bong Rhee; Chang Jin Lee, both of Taejeon, Rep. of Korea; Xianhong Wang, Changchun, China

[73] Assignee: Korea Research Institute of Chemical Technology, Taejeon, Rep. of Korea

[21] Appl. No.: 902,276

[22] Filed: Jul. 29, 1997

[30] Foreign Application Priority Data

Aug. 5, 1996 [KR] Rep. of Korea ............... 1996-32545

[51] Int. Cl.$^6$ .................................................. C08L 79/02
[52] U.S. Cl. ...................... 525/540; 525/403; 525/409; 524/156; 252/500
[58] Field of Search .................... 525/540, 403, 525/409; 524/156; 252/500

[56] References Cited

U.S. PATENT DOCUMENTS 5,250,639  10/1993  Oka ................................. 525/540

OTHER PUBLICATIONS

MacDiarmid, A.G.; "The Polyanilines: A Novel Class of Conducting Polymers"; *Conjugated Polymers and Related Materials, The Interconnection of Chemical and Electronic Structure*; Salaneck, W.R.; Lundstrom, I; Ranby, B., Eds.; Oxford University Press, 1993, pp. 73–98.

Tzou, K.T. and Gregory, R.V.; "Improved Solution Stability and Spinnability of Concentrated Polyaniline Solutions Using N, N'-Dimethyl Propylene Urea as the Spin Bath Solvent"; Synthetic Metals 1995, 69, pp. 109–112.

Andreatta, A., Cao, Y., Chiang, J.C., Heeger, A.J., and Smith; "Electrically-Conductive Fibers of Polyaniline Spun From Solutions in Concentrated Sulfuric Acid"; P. Synthetic Metals 1988, 26, pp. 383–389.

Cao, Y., Smith, P. and Heeger, A.J.; "Counter–ion Induced Processibility of Conduction Polyaniline and of Conducting Polyblends of Polyaniline in Bulk Polymers"; Synthetic Metals 1992, pp. 91–97.

Bergeron, J.Y., Chevalier, J.W. and Dao, Le H.J. Chem. Soc., "Water–Soluble Conducting Poly(aniline) Polymer"; J. Chem Soc., Chem. Commun. 1990, pp. 180–182.

Chen, S.A. and Hwang, G.W.; "Synthesis of Water–Soluble Self–Acid–Doped Polyaniline"; J. Am. Chem. Soc. 1994, 116, pp. 7939–7940.

Kim, E., Lee, M.H., Moon, B.S., Lee, C. and Rhee, S.B. "Redox Cyclability of a Self-Doped Polyaniline"; J. Electrochem. Soc.; Mar. 1994, 141, pp. L26–128.

DeArmitt, C., Armes, S.P., Winter J., Uribe, F.A., Gottesfeld, S., and Mombourquette, C.; "A Novel N–Substitutued Polyaniline Derivative", Polymer 1993, vol. 34, No. 1, pp. 158–162.

Nguyen, M.T. and Diaz, A.F.; "Water–Soluble Conducting Copolymers of o–Aminobenzyl Alcohol and Diphenylamine–4–sulfonic Acid", Macromolecules 1994, 27, 7003–7005.

Angelopoulos, M., Patel, N., Shaw, J.M., Labianca N.C., and Rishton, S.A.; "Water Soluble Conducting Polyanilines: Applications in Lithography"; J. Vac. Sci. Technol., B11(6), pp. 2794–2797 (Nov./Dec.) 1993).

Shannon, K., and Fernadez, J.E.; "Preparation and Properties of Water–Soluble, Poly(strenesulfonic acid)–doped Polyaniline"; J. Chem. Soc., Chem. Commun. pp. 643–664 (1994).

Tsutsumi, H., Fukuzawa, S., Ishikawa, M., Morita, M., and Matsuda, Y.; "Polyaniline–poly|p–styrenesulfonic acid-–co–methoxyoligo(ethylene glycol)acrylate| Composite Electrode for All–Solid–State Lithium Battery"; J. Electrochem. Soc., 142, No. 9, pp. L168–L170 (1995).

MacDiarmid A.G. Epstein, A.J.; "The Concept of Secondary Doping as Applied to Polyaniline"; Synthetic Metals 1994, 65, pp. 103–116.

*Primary Examiner*—Patricia A. Short
*Attorney, Agent, or Firm*—Hugh A. Abrams; Sidley & Austin

[57] ABSTRACT

This invention relates to a process for preparing water soluble conductive polyaniline composite represented by the formula(III) which comprises reacting emeraldine base-type polyaniline(EB) representing by the formula(I) with poly (ethyleneglycol) hydrogen sulfate (PEGSF) represented by the formula(II), and to water soluble conductive polyaniline composite synthesized by the said process Formula I

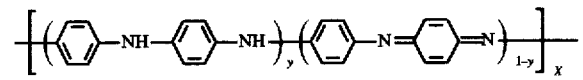

wherein, x is an integer or fractional number; y is 0 to 1

Formula II

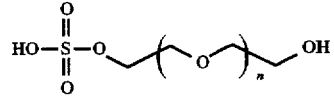

wherein, n is 4 to 200.

Formula III

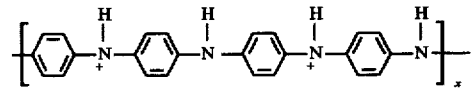

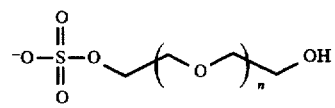

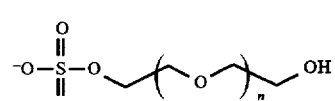

wherein, x and n are same as defined above.

3 Claims, 2 Drawing Sheets

5,795,942

WATER SOLUBLE CONDUCTIVE POLYANILINE COMPOSITES AND PROCESS FOR PREPARING THE SAME

FIELD OF THE INVENTION

The present invention relates to water soluble 3 conductive polyaniline composites and a process for preparing the same. More particularly, the invention relates to solution processible, conductive polyaniline composites represented by the following formula III and a process for preparing the said conductive polyaniline composites, in which polyaniline (emeraldine base, EB) represented by the formula I is reacted with poly(ethyleneglycol) hydrogen sulfate(PEGSF) represented by the formula (II)

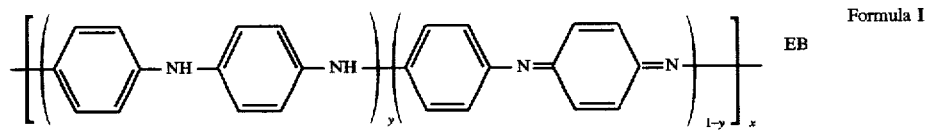
Formula I
EB wherein, x is an integer or fractional number; y is 0 to 1.

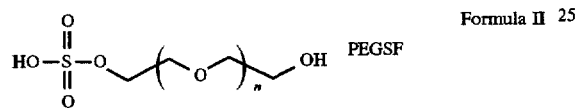
Formula II
PEGSF wherein, n is 4 to 200.

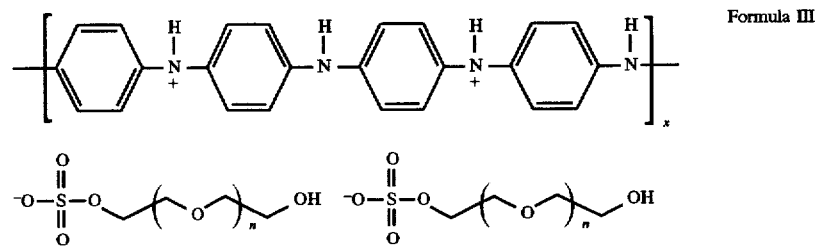
Formula III wherein, x and n are same as defined above.

PRIOR ART

Polyaniline is a typical one of polymers being inherently conductive, for which intensive studies are at present conducted. An emeraldine base (EB)-type polyaniline comprises a phenyldiamine formula and a quinone diimine formula, as shown in the following formula(I)

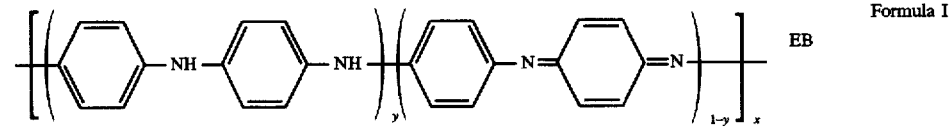
Formula I
EB phenyldiamine          quinonediimine wherein, x is an integer or fractional number; and y is 0 to 1.

The electrical conductivity may be imparted onto polyaniline through a protonation or oxidation doping. It is well known that polyaniline may conveniently be synthesized from relatively inexpensive monomers with a high yield and its conductive form has an excellent chemical stability and a relatively high conductivity (MacDiarmid, A. G. In Conjugated Polymers and Related Materials, The Interconnection of Chemical and Electronic Structure; Salaneck, W. R. ; Lundstrom, I; Ranby, B., Eds.; Oxford University Press, 1993, pp 73–98).

Polyaniline has excellent electric, electrochemical and optical properties, and thus it may be applied to a secondary battery, electroluminescent device, electrochromic device, sensor, and the like. Since polyaniline to be used in the above application should be used in the form of film or coating, the necessity of process for preparing solution processible polyaniline is very high. However, since the main chain of polyaniline has a rigid structure and the interaction of high molecular chains is strong, it is not possible to conduct a solution processing of polyaniline with a general process.

For ten or more years, many studies on the solution processing of polyaniline have made great progress. As a result, polyaniline which is soluble in organic solvent and water, and its processing method have been developed. Polyaniline may be treated with solution processing in strong polar Lewis base solvent, e.g., N-methylpyrolidinone (MacDiarmid, A. G. In Conjugated Polymers and Related Materials, The Interconnection of Chemical and Electronic Structure; Salaneck, W. R.; Lundstrom, I.; Ranby, B., Eds.; Oxford University Press, 1993, pp 73–98) or N,N'-dimethylpropylene urea(Tzou, K. T. and Gregory, R. V. Synth. Met. 1995, 69,109), or in concentrated acid (Andreatta, A., Cao, Y., Chiang, J. C., Heeger, A. J. and Smith, P. Synth. Met. 1988, 26, 383). More recently, it is known that conductive polyaniline may be processed in polar or nonpolar solvent by using protonic acid as a dopant such as dodecylbenzenesulfonic acid, camphorsulfonic acid, or the like (CaO, Y., Smith, P. and Heeger, A. J. Synth. Met. 1992, 48, 91).

Furthermore, various processes for preparing water soluble polyaniline have also been developed. Water soluble polyaniline may be prepared either by introducing alkanesulfonic group into the site of nitrogen of polyaniline (Bergeron, J. Y., Chevalier, J. W. and Dao, Le H. J. Chem. Soc., Chem. Commun. 1990,180; Chen, S. A. and Hwang, G. W. J. Am. Chem. Soc. 1994, 116,7939) or by synthesizing aniline-N-Alkylsulfonate and then conducting directly its electrochemical or chemical polymerization (Kim, E., Lee, M. H., Moon, B. S., Lee, C. and Rhee, S. B. J. Electrochem. Soc. 1994, 141, L26). More recently, it is known that water soluble conductive polyaniline containing N-arylsulfonate group may be prepared either by directly polymerizing diphenylamine-4-sulfonic acid (DeArmitt, C., Armes. C. P., Winter. Uribe. F. A., Gottesfeld, and Mombourquette, C. Polymer 1993, 34, 158) or by copolymerizing O-aminobenzyl alcohol and diphenyl-4-sulfonic acid (Nguyen, M. T. and Diaz, A. F. Macromolecules 1994, 27, 7003).

In addition, it is also known that water soluble polyaniline compounded with a high molecular acid may be prepared by polymerizing aniline in the presence of high molecular acid with a chemical oxidation method [M. Angelopoulos, N. Patel, J. M. Shaw, N. C. Labianca and S. A. Rishton, J. Vac. Sci. Technol. B11, 2794 (1993); K. Shannon, and J. E. Fernadez, J. Chem. Soc. Chem. Commun., 643 (1994)].

It is very difficult to separate and purify water soluble polyaniline products prepared by the above processes from the reaction solvents and by-products after polyanilines are polymerized. That is, it is not easy to remove reagents being remained without reacting with by-products from water which is used as a solvent. In general, the purification of polyaniline may be conducted with dialysis which is a very time consuming process. It is also very difficult to determine the purity of polyaniline since the water soluble polyaniline become partly insoluble after drying it completely by removing water which is a solvent. Furthermore, in order to produce water soluble polyaniline solution with a desired concentration, an excess of water should be eliminated.

Furthermore, in case where the use of polyaniline film or coating prepared by solution processing is electrochemical, electrochemical properties of the said polyaniline, i.e., reversible oxidation reduction reactivity and oxidation reduction stability(durability) according to repeating times are very important. The most important one of factors defining these properties is an ion conductivity of polyaniline film because the diffusion velocity of ion in all electrochemical reaction has great influence on the oxidation reduction reversibility and the durability of polyaniline film.

It is reported that oxidation-reduction repeating stability of N-alkylsulfonic acid-substituted polyaniline under the acidic condition is 100,000 or more times (Kim, E., Lee, M. H., Moon, B. S., Lee, C. and Rhee, S. B. J. Electrochem. Soc. 1994, 141, L26). However, the acidic condition is not proper to the application of secondary battery or electrochromic device.

Recently, it is reported that polystyrenesulfonic acid and oligoethylene glycolacrylate are copolymerized and the resultant copolymer is used as a dopant of polyaniline to enhance its electrical property(H. Tsutsumi, S. Fukuzawa, M. Ishikawa, M. Morita, and Y. Matsuda, J. Electrochem. Soc., 142, L168(1995)]. In this case, it is revealed that the electrical property of polyaniline is scarcely varied even after the charge and discharge of electricity are repeated about 40 times. In this case, polyaniline composite is formed directly onto the electrode, in which said polymer dopant is coated. Thus, polyaniline composite has no solution processibility.

In order to solve these disadvantages of prior art, the development of solution processible polyaniline composite having an excellent electrical property is in demand.

In order to prepare water soluble polyaniline without modifying polyaniline or aniline monomer, it is preferable to prepare water soluble polyaniline composite by reacting emeraldine base-type polyaniline with a proper dopant. Since in this process polyaniline composite is prepared by using purified emeraldine base-type polyaniline and a dopant, no by-products are produced. Therefore, the purity of polyaniline composite thus prepared is high, and its solution processing is possible. Furthermore, it also has an advantage that the concentration of solution may easily be controlled by adding the solvent.

In order to prepare polyaniline composite which is water soluble, the dopant to be used in this process should have enough hydrophilia. As such hydrophilic group, polyalkylether-containing compound such as polyethylene glycol may be considered. In this case, polyalkylether group is very stable in general use since its reactivity is low, and this group may be acted as a group enhancing ionic conductivity. Since the rate of ion migration is main factor deciding on reaction rate in electrochemical reaction, it is very advantageous that alkylether group capable of enhancing ionic conductivity is existent in the structure of dopant.

SUMMARY OF THE INVENTION

Based on these findings, the present inventors have completed the invention. In accordance with the invention, it is possible to synthesize PEGSF having chains whose hydrophilia is good, including alkylether group. It is also possible to prepare polyaniline composite which is water soluble, without transforming the structure of polyaniline when emeraldine base-type polyaniline (hereinafter "PAni") is doped with PEGSF. It has been found that the electrical properties of film cast from aqueous polyaniline composite solution i.e., the oxidation reduction reversibility and the durability on the cyclic scanning potential reaction are improved.

DETAILED DESCRIPTION OF THE INVENTION

It is an object of this invention to provide water soluble conductive polyaniline composites prepared by doping polyaniline with PEGSF having hydrophylic chains.

It is another object of this invention to provide a process for preparing water soluble conductive polyaniline composites which comprise reacting an emeraldine base(EB) polyaniline poly(ethyleneglycol) hydrogen sulfate (PEGSF).

It is a further object of this invention to provide polyaniline composites, for which electrochemical stability of said composites is enhanced by doping emeraldine base-type polyaniline with PEGSF containing alkylether group.

These and other objects, together with the advantages over the known conductive composites and processes shall become apparent from the specification which follows and accomplished by the invention as hereinafter described and claimed.

Preparation of Poly(ethyleneglycol) hydrogen sulfate (PEGSF)

Poly(ethyleneglycol) hydrogen sulfate(PEGSF) is prepared from poly (ethyleneglycol) by using a process described in the literature with some modifications (DeArmitt, C., Armes, C. P., Winter, J., Uribe, F. A., Gottesfeld, J. and Mombourquette, C. Polymer 1993, 34, 158). That is, poly(ethyleneglycol) and sulfamic acid are mixed at room temperature and then heated to obtain ammonium poly(ethyleneglycol) sulfate. Thereafter, ammonium poly(ethyleneglycol) sulfate thus obtained is passed through cation exchange resin to give poly(ethyleneglycol) hydrogen sulfate.

An elementary analysis for PEGSF thus obtained is carried out. As a result, since the content of nitrogen is observed with an extent of $10^{-2}$ wt %, it is apparent that PEGSF is almost substituted by sulfate instead of ammonium. It has been found that PEGSF contains monosulfate in lieu of disulfate, taking into consideration of its NMR spectrum, and that pH of 0.1M aqueous PEGSF solution is about 1. Poly(ethyleneglycol) disulfate is easily prepared from 1 equivalent of poly(ethyleneglycol) and 2 equivalents of sulfamic acid.

Figure 1:
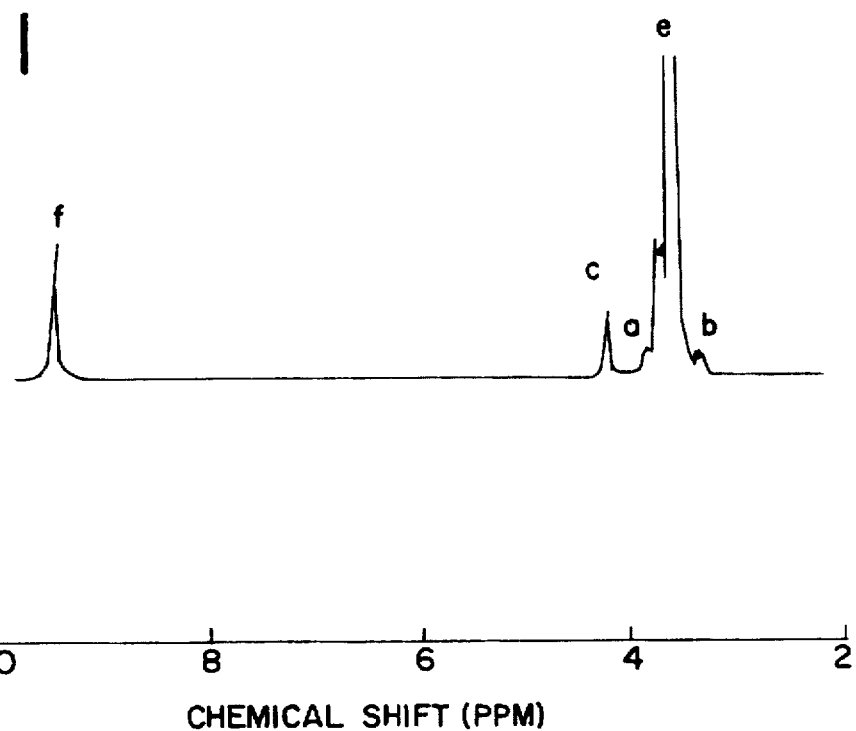
FIG. 1 shows a graph of $H^1$-NMR spectrum of PEGSF in $CDCl_3$.

$H^1$-NMR spectrum of the above PEGSF (molecular weight of PEG is about 1000) is shown in FIG. 1.

Preparation of Water Soluble Conductive Polyaniline Composite

Emeraldine base-type polyaniline is mechanically blended with PEGSF at room temperature, in which the equivalent ratio of PEGSF to aniline unit contained in the said polyaniline is 0.5 to 1, and then 1 to 10 ml of distilled water are added thereto. The reactants are stirred by using a magnetic stirrer at room temperature to obtain light green-colored aqueous solution.

Figure 2:
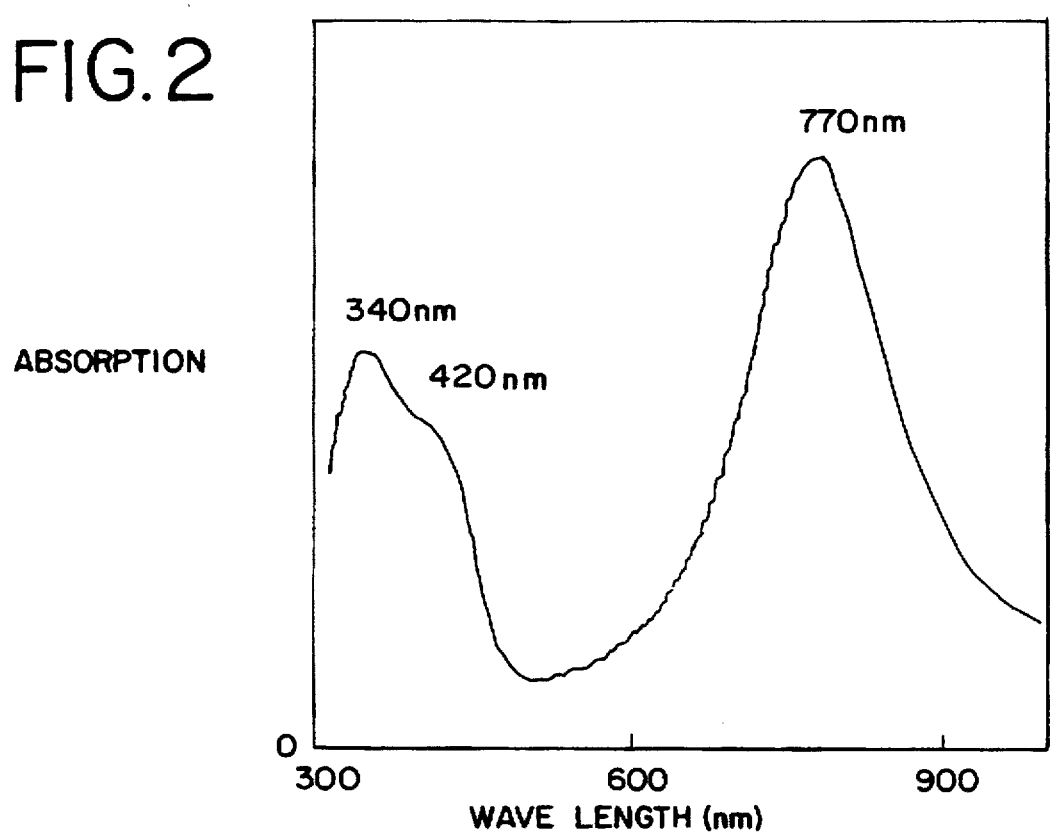
FIG. 2 shows a graph of UV-vis spectrum of PAni-PEGSF in its aqueous solution.

The UV-vis spectrum of the above PAni-PEGSF aqueous solution is shown in FIG. 2. Three absorption peaks having center around 340 nm, 420 nm, and 770 nm are found, respectively. It can be seen from the above absorption peaks that the said PAni-PEGSF is doped, and it has a polaron structure which is locally distributed(MacDiarmid A. G. and Epstein, A. J. Synth. Met. 1994, 65, 103). Thus, it is expected that the electrical conductivity of polyaniline thus obtained is not so high. Practically, it is confirmed that the electrical conductivity of polyaniline film cast from polyaniline—PEGSF aqueous solution is $10^{-3}$ S/cm.

It is noted that there exists a difference in solubility of PAni-PEGSF according to the average molecular weight of PEGSF used as a dopant, in other words, to the average molecular weight of PEG. When the average molecular weight of PEG is between 1000 and 8000, the solubility of PAni-PEGSF is most high, and when the average molecular weight of PEG is 600, PAni-PEGSF is partially dissolved. Furthermore, even when disulfate in PEGSF is used in lieu of monosulfate, PAni-PEGSF is only partially dissolved. It is reasoned that disulfate groups positioned at both ends of PEG are acted as dopant, and thus these groups are also served as crosslinking agent.

It is observed that PAni-PEGSF thus obtained is not only dissolved in water, but also in protic solvent such as ethanol, in which the solubility of both solvents is almost equal to each other. There are advantages that it is possible to use a mixture of water and protic solvent as a solvent, and to use only a protic solvent in lieu of water in case where water cannot be used.

Figure 3A:
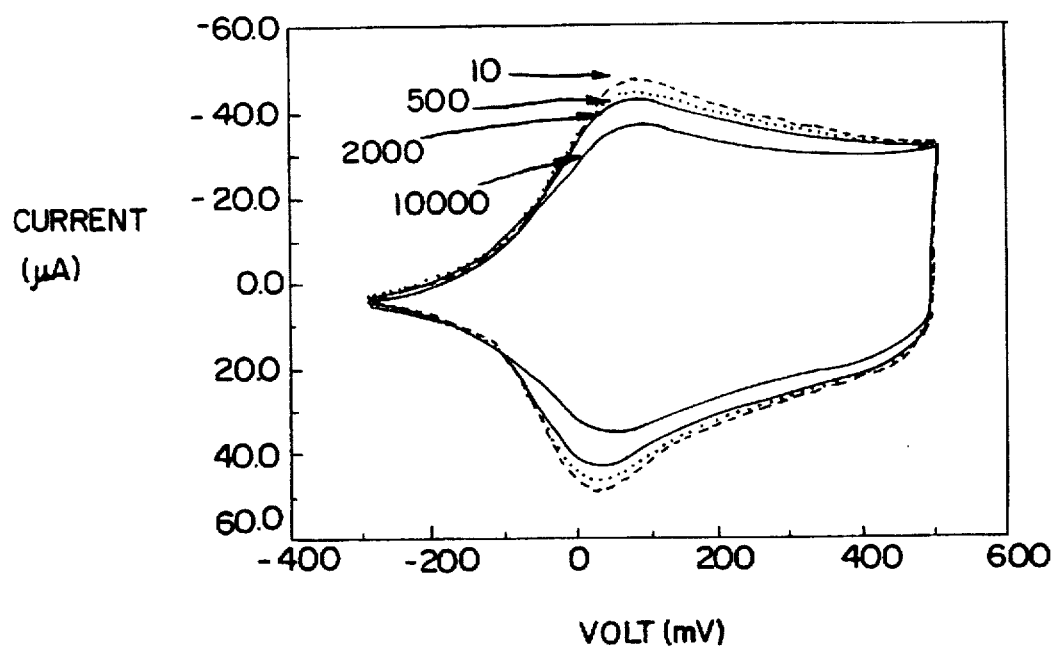
FIG. 3a depicts a graph showing the variance of cyclic voltammogram of PAni-PEGSF coated electrode with repetitive cycles in acetonitrile having 0.1M $LiClO_4$ as a supporting electrolyte.
Figure 3B:
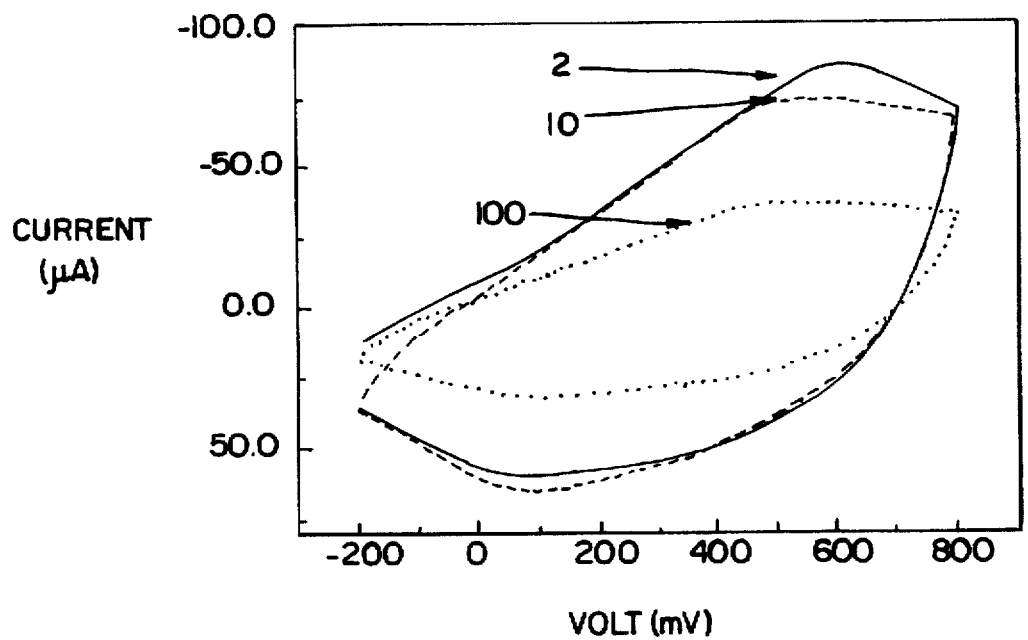
FIG. 3b depicts a graph showing the variance of cyclic voltammogram of PAni-HCl coated electrode with repetitive cycles in acetonitrile having 0.1M $LiClO_4$ as a supporting electrolyte.

In order to investigate the electrochemical property of film cast from the above PAni-PEGSF aqueous solution, PAni-PEGSF solution is coated on the platinum electrode and then dried. The electrochemical property of PAni-PEGSF is investigated in acetonitrile with the cyclic voltammetry(CV). A cyclic voltammogram of PAni-PEGSF in acetonitrile/0.1M $LiClO_4$ solution is shown in FIG. 3a. It can be seen that a considerable variance of reversible electric voltage-current to oxidation reduction is shown, and the electical activity of about 70% or more is maintained even after the repeating cycle of 10,000 times is made. In comparison thereto, a cyclic voltammogram of PAni-HCl (a film which is cast from PAni-NMP solution and then doped with HCl) is shown in FIG. 3b. It can be seen that since there exists a difference of several hundreds or more mV in oxidation reduction peak, the above PAni-HCl is disadvantageous for electrochemical use. Furthermore, it can also be seen that the electrical activity of PAni-HCl is quickly decreased to 50% or less after repetitive cycles of 100 times are carried out. In the above CV experiment, the scanning velocity is 100 mV/s, and Ag/AgCl is used as a reference electrode.

It is believed that the difference of such electrochemical property is due to the fact that the rate of ion migration according to electrochemical reaction is improved under the influence of alkylether group existing in PAni-PEGSF composite.

Preparation Example 1.

Preparation of PEG(200)SF from PEG(average molecular weight of 200)

10 g of polyethyleneglycol ("PEG") (average weight molecular weight of 200, Aldrich Co.) and 5.34 g of sulfamic acid (Aldrich Co.) were filled into three necked flask under the atmosphere of nitrogen, and then resulting reaction mixture was heated at a temperature of 50° C. to obtain viscous liquid. This liquid was vigorously stirred while the nitrogen gas was filled thereinto, and then nitrogen gas was exhausted with a vacuum pump. Such filling and exhaustion of nitrogen gas were repeated several times, and thereafter the mixture was gradually heated to 140° to 150° C. When the reaction was continued for 2 hrs., pH of reaction mixture was measured with 3–4. Thereafter, the reaction mixture was cooled to room temperature 203 and then dissolved in 200 ml of distilled water. This solution was slowly passed through an acidic cation exchange resin (Dowex 50$^W$×8) to obtain 0.1M PEGSF aqueous solution(pH=ca.1). This aqueous solution was concentrated to obtain 14 g of PEG(200) SF(yield=91%).

Various PEGSF were synthesized from PEG having different average molecular weights with the same process as above. The elementary analysis for synthesized PEGSF and their synthetic yield were shown in the following Table 1.

then washed with 10 l of distilled water, 4 l of acetone and 1 l of propyl alcohol in the order named, and finally dried completely to obtain 40 g of emeraldine base-type polyaniline (yield=44%).

EXAMPLE 2.96 g of PEG(200) SF synthesized in Preparation Example 1 and 1.8 g of emeraldine base-type polyaniline were thoroughly mixed at room temperature, and then 10 mλ of distilled water were added thereto. The reactants were stirred by using a magnetic stirrer at room temperature for 2 to 10 hrs to obtain PAni-PEG(200)SF. By using the same

TABLE 1

Elementary analysis for PEGSF having different average molecular weights and their synthetic yield

| Kind of PEGSF | Average molecular weight of PEG | Calculated (%) | | | Found (%) | | | Yield (%) |
|---|---|---|---|---|---|---|---|---|
| | | C | H | S | C | H | S | |
| PEG(200)SF | 200 | 36.48 | 6.80 | 10.82 | 36.95 | 7.2 | 10.2 | 91 |
| PEG(600)SF | 600 | 46.85 | 8.15 | 4.61 | 46.11 | 7.53 | 5.03 | 93 |
| PEG(900)SF | 900 | 49.16 | 8.45 | 3.22 | 50.12 | 8.90 | 3.96 | 92 |
| PEG(1000)SF | 1000 | 49.65 | 8.52 | 2.92 | 50.45 | 8.92 | 3.11 | 93 |
| PEG(1500)SF | 1500 | 51.18 | 8.72 | 2.01 | 51.86 | 9.10 | 2.19 | 95 |
| PEG(2000)SF | 2000 | 51.98 | 8.82 | 1.53 | 51.44 | 8.36 | 2.07 | 95 |
| PEG(3400)SF | 3400 | 53.00 | 8.95 | 0.92 | 53.41 | 9.07 | 1.25 | 90 |
| PEG(4600)SF | 4600 | 53.39 | 9.00 | 0.68 | 54.01 | 9.40 | 0.81 | 91 |
| PEG(8000)SF | 8000 | 53.87 | 9.07 | 0.40 | 54.44 | 9.35 | 0.32 | 93 |

Preparation Example 2.
Preparation of emeraldine base-type polyaniline

To one liter of aqueous solution, wherein 93 g of aniline and 87 ml of 35% aqueous hydrochloric acid solution were dissolved therein, were slowly added dropwise 600 ml of aqueous solution, wherein 228 g of ammonium persulfate were dissolved, at 0° C. over 3 hrs. Upon completion of dropwise addition, the reaction mixture was reacted under mechanical stirring for 12 hrs., and then precipitated polyaniline was collected with filtration under vacuum. The filtered polyaniline was put into 3 l of distilled water in the wet form prior to its drying, and then sufficiently stirred to wash polyaniline, and finally filtered again. This washing process was repeated two times, and then washed with 4 l of acetone and finally with 1 l of distilled water.

Polyaniline thus obtained was added to 10 l of 0.5–1% aqueous ammonia solution prior to its drying, and then sufficiently stirred for 10 hrs. The dedoped polyaniline thus obtained was collected with filtration under vacuum, and process as above, except that the following PEGSF, i.e., PEG(600) SF(6.96 g), PEG(900) SF(9.96 g), PEG(1000) SF(10.96 g), PEG(1500) SF(15.96 g), PEG(2000) SF(20.96 g), PEG(3400) SF(34.96 g), PEG(4600) SF(46.96 g) and PEG(8000) SF(80.96 g) were used in lieu of PEG(200) SF(2.96 g), the following PAni-PEGSF shown in Table 2 were synthesized. The solubility of PAni-PEGSF according to the molecular weight of PEG and elementary analysis result of PAni-PEGSF after drying under vacuum were shown in the following Table 2.

The solubility of PAni-PEGSF was most high when the molecular weight of PEG was between 900 and 8000, and PAni-PEGSF having molecular weight of PEG deviating the above range was partially dissolved.

PAni-PEGSF solution was diluted with distilled water, and its UV-vis spectrum was observed. As a result, there was no variance in the absorption peak according to the solubility.

TABLE 2

Elementary analysis for PAni-PEGSF and their solubility

| | Calculated (%) | | | | Found (%) | | | | Solubility |
|---|---|---|---|---|---|---|---|---|---|
| | C | H | N | S | C | H | N | S | |
| PAni-PEG(200)SF | 51.83 | 7.87 | 5.76 | 6.59 | 51.03 | 8.67 | 5.11 | 6.25 | Δ |
| PAni-PEG(600)SF | 53.05 | 8.45 | 3.16 | 3.62 | 52.80 | 9.12 | 3.00 | 3.45 | Δ |
| PAni-PEG(900)SF | 53.42 | 8.63 | 2.36 | 2.70 | 52.91 | 9.02 | 2.18 | 2.01 | ○ |
| PAni-PEG(1000)SF | 53.51 | 8.67 | 2.18 | 2.49 | 53.10 | 9.46 | 2.08 | 2.15 | ○ |
| PAni-PEG(1500)SF | 53.80 | 8.80 | 1.57 | 1.79 | 53.54 | 9.48 | 1.32 | 1.38 | ○ |
| PAni-PEG(2000)SF | 53.96 | 8.88 | 1.22 | 1.40 | 53.59 | 9.20 | 1.02 | 1.14 | ○ |
| PAni-PEG(3400)SF | 54.17 | 8.98 | 0.76 | 0.87 | 53.96 | 9.31 | 0.65 | 0.47 | ○ |

TABLE 2-continued

Elementary analysis for PAni-PEGSF and their solubility

| | Calculated (%) | | | | Found (%) | | | | Solubility |
|---|---|---|---|---|---|---|---|---|---|
| | C | H | N | S | C | H | N | S | |
| PAni-PEG(4600)SF | 54.26 | 9.02 | 0.57 | 0.66 | 53.88 | 9.44 | 0.46 | 0.50 | ○ |
| PAni-PEG(8000)SF | 54.37 | 9.08 | 0.34 | 0.39 | 53.97 | 9.39 | 0.26 | 0.19 | ○ |

Note:
Δ: Partially dissolved.
○: Completely dissolved and made transparent solution.

The water soluble conductive polyaniline composites prepared in accordance with the invention may be applied to antistatic element, anticorrosive element, electrode material of secondary battery, electrochromic device, sensor, and the like.

What is claimed is:

1. A process for preparing water soluble conductive polyaniline composite representing by the formula(III) which comprises reacting emeraldine base-type polyaniline (EB) represented by the formula(I) with poly (ethyleneglycol) hydrogen sulfate (PEGSF) represented by the Formula(II)

Formula I

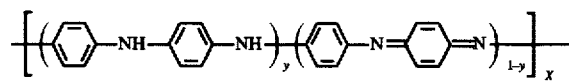

wherein, x is an integer or fractional number; y is 0 to 1.

Formula II

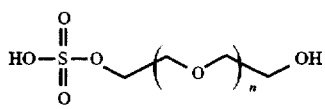

wherein, n is 4 to 200

Formula III

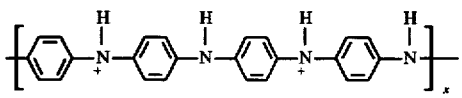

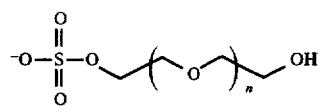

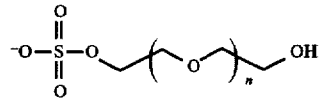

wherein, x and n are same as defined above.

2. A water soluble conductive polyaniline composite representing by the formula(III) which is prepared by reacting emeraldine base-type polyaniline(EB) representing by the formula(I) with poly](ethyleneglycol) hydrogen sulfate (PEGSF) representing by the formula(II)

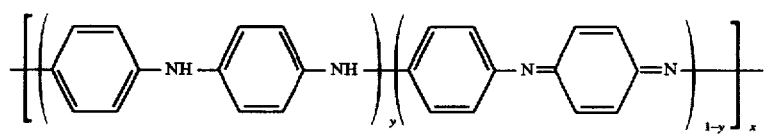

Formula I wherein, x is an integer or fractional number; y is 0 to 1.
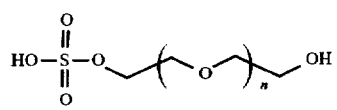
Formula II
wherein, n is 4 to 200.
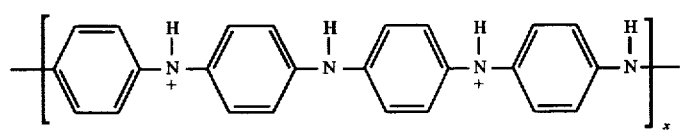
Formula III
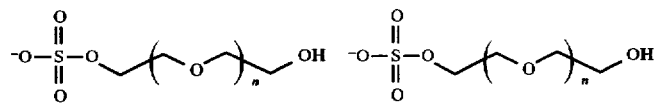
wherein, x and n are same as defined above.
3. The polyaniline composite according to claim 2, wherein the average molecular weight of said poly (ethyleneglycol) hydrogen sulfate (PEGSF) is between 900 and 8000.
* * * * *